United States Patent [19]

Couderc et al.

[11] 3,878,226

[45] Apr. 15, 1975

[54] TELOMERS, THEIR PREPARATION AND THEIR USE

[75] Inventors: Pierre Couderc, Aix Noulette; Daniel Roussel, Bully-les-Mines; Jean Croisier, Bethune, all of France

[73] Assignee: Societe Chimique des Charbonnages C.d.F. Chimie, Paris, France

[22] Filed: June 27, 1972

[21] Appl. No.: 266,675

[30] Foreign Application Priority Data
June 29, 1971 France .............................. 71.23793

[52] U.S. Cl. .............................. 260/340.7; 260/606
[51] Int. Cl. ...................... C07d 15/04; C07d 15/06
[58] Field of Search ................................. 260/340.7

Primary Examiner—Alton D. Rollins
Assistant Examiner—Jose Tovar

[57] ABSTRACT

Telomers useful for stabilizing aqueous formaldehyde solutions are made by telomerising vinyl acetate and carbon tetrachloride, oxidising the product, and then acetalising it with formaldehyde.

2 Claims, 2 Drawing Figures

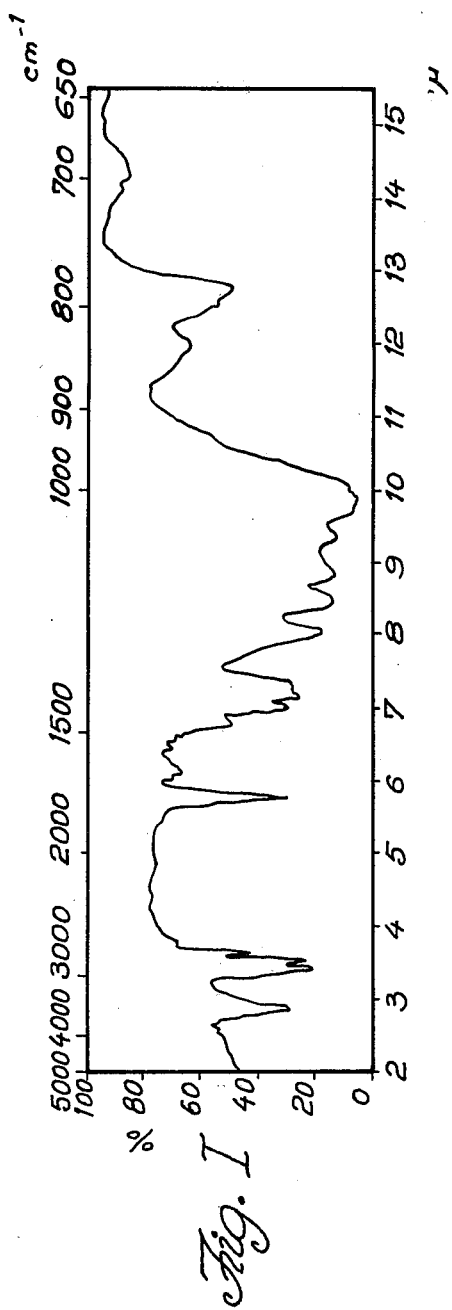
Fig. I
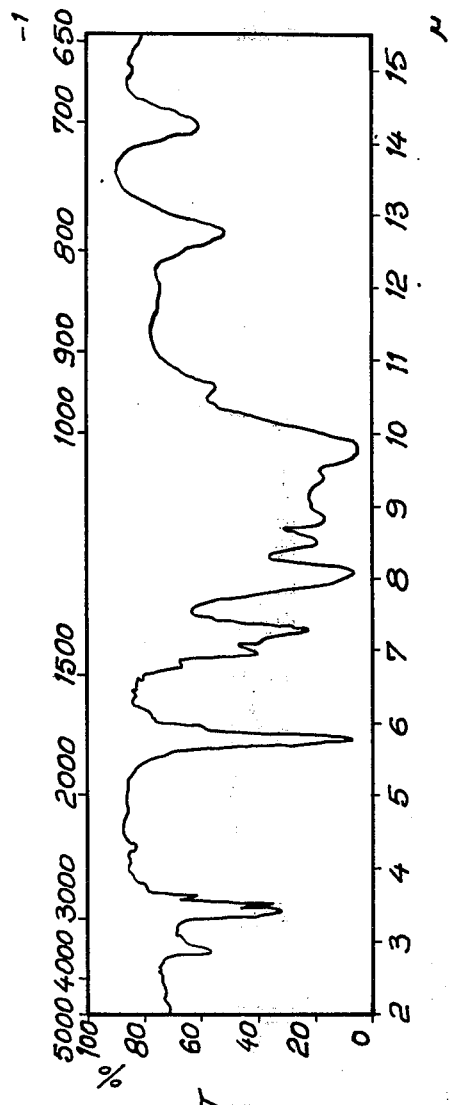
Fig. II

TELOMERS, THEIR PREPARATION AND THEIR USE

The present invention relates to telomers based on vinyl acetate, a process for their preparation and their use.

Telomerisation is a reaction of a telogen YZ with several molecules of an unsaturated compound, called a taxogen, to form products of the formula $Y(A)_nZ$ in which A denotes the divalent residue of a taxogen unit, this being a unit in which an ethylenic double bond has been opened. It is generally considered that, given that the polymerisation reaction of the unsaturated compound is carried out in the presence of the telogen, the number $n$ in the chemical formula of the product obtained is relatively small.

The new telomers of the present invention comprise at least 10% by weight of 1,3-dioxane groups of the formula

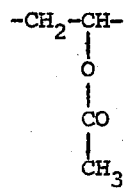

and from 5 to 25% by weight of chlorine, the remainder consisting principally of acetate groups of the formula

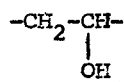

and alcohol groups of the formula

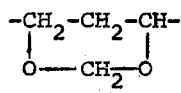

The new telomers can be represented by an extended chemical formula such as

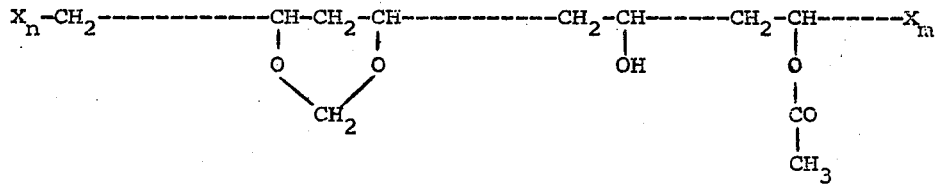

in which X is a chlorine atom, it being understood that the various groups and the chlorine atoms can be distributed randomly and that certain internal condensations can occur, which implies that the sum of the percentages of the various constituents named above (various groups and chlorine) can be less than 100.

The new telomers preferably have a limiting viscosity index ($\eta$ cm³/g.) between 2 and 10, as determined in dimethylformamide at 30°C.

The new telomers are prepared as follows:

A vinyl acetate telomer is made by telomerising vinyl acetate and carbon tetrachloride in the presence of a polymerisation initiator. The degree of polymerisation ($\overline{DP}$) of the telomer may be calculated from the proportion of chlorine attached, by means of the relationship:

$$\overline{DP} = \frac{7100}{43\,x} - \frac{78}{43} \qquad x = \% \text{ of chlorine (1)}$$

The product obtained is then reacted, in solution, with an oxidising agent, preferably hydrogen peroxide at 50° to 75°C in glacial acetic acid, in an amount substantially equal to 1 equivalent of free oxygen for 1 equivalent of chlorine contained in the telomer. The product thus obtained is then acetalised by treatment, in an inorganic acid medium with formaldehyde. The final product is recovered by neutralisation and precipitation.

In this process, the most delicate operation consists of replacing a certain number of acetate groups in the vinyl acetate telomer with 1,3-dioxane groups. Experience shows that a conventional acetalisation using formaldehyde, carried out in solution in the presence of an inorganic acid, does not lead to the desired product but to tarry products, as a result of extensive resinification.

This resinification is avoided in the present invention by introducing, at the same time as the solvent, one equivalent of hydrogen peroxide per equivalent of chlorine present in the telomer to be treated. Under these conditions, acetalisation is rendered possible, and the final products have relatively high proportions of 1,3-dioxane groups, which can be as high as 30 to 40%.

The new telomers are useful for stabilising aqueous formaldehyde solutions. It is well known that, unless particular precautions are taken, concentrated aqueous formaldehyde solutions are not stable, in the sense that after being stored for a few hours, or at best for a few days, precipitation of undesirable polymers occurs, which renders these solutions cloudy. To reduce this precipitation, formaldehyde solutions must be stored at relatively high temperatures (50° to 60°C.). Other reactions then occur, such as the disproportionation of formaldehyde to yield formic acid and methanol, which is obviously not desirable.

To avoid these disadvantages, various stabilisers for cold aqueous formaldehyde solutions have been proposed, for example, methanol, urea, and melamine, but generally have insufficient stabilising action.

Recently, it has been proposed to stabilise aqueous formaldehyde solutions by adding poly(vinyl-formal). Unfortunately, the known polymers of this type are practically insoluble in aqueous formaldehyde solutions, which renders this process ineffective and unreliable in use.

The new telomers stabilise aqueous formaldehyde solutions at the temperatures at which the latter are normally stored. They are used preferably at the rate of 0.0005% to 0.05% by weight of the aqueous formaldehyde solution.

The non-limiting Examples which follow illustrate the invention.

EXAMPLE 1

The synthesis of the telomer is carried out in the following manner:

850 g. of freshly distilled vinyl acetate, 150 g. of carbon tetrachloride and 8.5 g. of benzoyl peroxide are introduced simultaneously into a 6 litre flask, equipped with a stirrer and a temperature recording device and placed in a thermostatically controlled bath. The duration of polymerisation is 4 hours 30 minutes, under the following temperature conditions:

a. From 0 to 30 minutes, the temperature in the reactor is gradually raised from 20° to 70°C;

b. from 30 minutes to 3 hours 30 minutes, the temperature is kept between 70° and 75°C; and c. from 3 hours 30 minutes to 4 hours 30 minutes, the temperature is gradually raised to 85°C.

By keeping to these working conditions, the reaction has no tendency to become violent and the extent of conversion of vinyl acetate into poly(vinyl acetate) is practically quantitative.

The polymer obtained is then dissolved, at 65°C, in 2,964 g. of glacial acetic acid containing 432 g. of 110 volume strength hydrogen peroxide. 470 g. of 47% formaldehyde solution and 60 g. of concentrated sulphuric acid (98%) are added to this solution. Acetalisation is carried out at 75°C. The amount of 1,3-dioxane groups formed increases up to 8 hours and then becomes stabilized.

After the reaction, 120 g. of concentrated ammonia are added and the polymer is then precipitated by pouring the final solution into 68 litres of water in the presence of 136 g. of sodium hydroxide.

After drying in vacuo and grinding, 500 g. of a yellow ochre powder are obtained, the physico-chemical properties of which as a function of the acetalisation time are given in Table I below.

These products were characterised by infra-red spectrography. The spectra shown in the single FIGURE have the double advantage of confirming the presence of the groups determined by chemical means and of showing clearly the fundamental differences in structure which exist between these products (II) and a conventional poly(vinyl-formal) (I).

It will be noted that certain products according to the invention obviously contain "radicals" other than those mentioned in Table I. This is particularly marked when the duration of acetalisation is relatively long (for example 16 hours) or the sum of the "radicals" determined represents only 77% of the total weight of the material. Although it is not known exactly what these non-determined "radicals" are, it is reasonable to suppose that they originate from intermolecular condensations or from various polymerisations.

All these polymers are very good stabilising agents for aqueous formaldehyde solutions. However, the best results were recorded with samples obtained after acetalisation times of between 6 and 10 hours.

The technique used to stabilise aqueous formaldehyde solutions is as follows:

The stabilising agent is first dissolved in a solvent, preferably methanol or methyl ethyl ketone, so as to obtain a solution containing approximately 1 to 5% of stabilising agent; this solution is then injected, with stirring and without additional precautions, into the formaldehyde solution to be stabilised.

The stabilisation conditions which have to be adhered to correspond to the following standards:

a. Stabilisation temperature 22°C. and b. duration of complete stability greater than or equal to 1 month.

For formaldehyde solutions of strength greater than 44%, this test is sufficiently rigorous to judge the efficiency of the stabilising agent. The samples of stabilising agent corresponding to acetalisation times of 10 hours make it possible to show that:

a. 6 ppm are sufficient to stabilise a 44% strength aqueous formaldehyde solution;

b. 28 ppm are sufficient to stabilise a 45% strength aqueous formaldehyde solution;

c. 50 ppm are sufficient to stabilise a 46% strength aqueous formaldehyde solution; and d. 90 ppm are sufficient to stabilise a 47% strength aqueous formaldehyde solution.

EXAMPLE 2

In order to control the vinyl acetate polymerisation reaction more effectively, it is preferable to introduce the reactants gradually. The following technique may, for example, be used. 60 cm$^3$ of a mixture consisting of 880 g. of freshly distilled vinyl acetate, 120 g. of carbon tetrachloride and 8.8 g. of benzoyl peroxide are introduced into a 6 litre reactor equipped with a stirrer, a temperature recording device and a pump which allows the reactants to be introduced, and which is placed in a thermostatically controlled bath.

The initial temperature in the reactor is 72°C. The temperature is gradually increased until it reaches approximately 80°C. and the remainder of the mixture of reactants is then introduced at a rate of 22 cm$^3$/hour. As soon as the introduction is finished, the reaction is completed by raising the temperature to 85°–86°C.

The telomer obtained is then taken up, at 60°C., in 3,026 g. of glacial acetic acid containing 353 g. of 110 volume hydrogen peroxide.

Acetalisation is carried out at 75°C. by introducing 63 g. of concentrated sulphuric acid (98%) and 499 g. of a 47.4% strength aqueous formaldehyde solution into the above solution. The duration of the reaction is 8 hours.

The final product is recovered in the same manner as in Example 1. 400 g. of a yellow powder are obtained, the physico-chemical properties of which are given in Table II below.

This product is a very good stabilising agent for aqueous formaldehyde solutions. The stabilisation technique and the control test of the stabilising power are the same as for Example 1. Under these conditions, it was found that:

a. 3 ppm are sufficient to stabilise a 44% strength aqueous formaldehyde solution;

b. 10 ppm are sufficient to stabilise a 45% strength aqueous formaldehyde solution;

c. 25 ppm are sufficient to stabilise a 46% strength aqueous formaldehyde solution; and d. 75 ppm are sufficient to stabilise a 47% strength aqueous formaldehyde solution.

EXAMPLE 3

The technique for preparing the telomer is the same as in Example 2. Only the proportions of the reagents employed were altered.

On this occasion, 860 g. of freshly distilled vinyl acetate, 95.5 g. of carbon tetrachloride and 8.6 g. of benzoyl peroxide were used. After polymerisation, the telomer is treated, at 60°C., with a mixture containing 2,766 g. of glacial acetic acid and 268 g. of 110 volume strength hydrogen peroxide.

In this Example, the sulphuric acid may be replaced by hydrochloric acid. Taking account of the above weights of reagents, the amounts of acid and formaldehyde introduced are respectively:

156 g. of HCl (38%) + 469 g. of HCHO (47.4%)

or 59 g. of $H_2SO_4$ (98%) + 469 g. of HCHO (47.4%).

The final product is recovered as in Example 1, or by any other known means.

Approximately 450 g. of a yellow powder are obtained, which, depending on the duration of acetalisation, possesses the physico-chemical properties described in Table III below.

These various samples show a strong stabilising power on aqueous formaldehyde solutions. Their activity is substantially the same, whatever the duration and the method of acetalisation (except for the product which was acetalised over a period of 4 hours in the presence of sulphuric acid). It was verified by the stability test that:

a. 3 ppm are sufficient to stabilise a 44% strength aqueous formaldehyde solution;

b. 10 ppm are sufficient to stabilise a 45% strength aqueous formaldehyde solution;

c. 30 ppm are sufficient to stabilise a 46% strength aqueous formaldehyde solution; and d. 85 ppm are sufficient to stabilise a 47% strength aqueous formaldehyde solution.

It is important to note that these products make it possible to stabilise formaldehyde solutions of high strength at temperatures other than 22°C. and, in particular, at temperatures below 22°C.

For example, 50 ppm of the above samples are sufficient to stabilise a 44% strength formaldehyde solution completely and for more than 1 month, at 15°C.

Another very important characteristic of the new telomers is that if formaldehyde solutions, stabilised with them, are caused to produce precipitates by subjection to a temperature below the stabilisation temperature, the precipitate of paraformaldehyde obtained does not set solid and redissolves easily when the solution is heated to about 50°–55°C. (a phenomenon which has not been observed with other stabilising agents). The resulting solution retains the same properties of stability as the original solution when it is stored at an appropriate stabilisation temperature.

TABLE I

| Sample | % of Cl | % of vinyl acetate groups | % of vinyl alcohol groups | % of 1,3-dioxane groups | Total in % | % of sulphur | ($\eta$) cm³/g limiting viscosity index | Mn, average molecular weight determined by ebulliometry | Theoretical DP calculated using the relationship I |
|---|---|---|---|---|---|---|---|---|---|
| Telomer prepared according to the conditions of Example 1 | 13.3 | | | | | | | | 11 |
| Telomer after attack by $H_2O_2$ | 11.2 | | | | | | in acetone at 25°C 3.3 | | 13 |
| Product obtained after 2 hours of acetalisation | 11.5 | 69 | 4 | 15 | 99.5 | | in dimethylformamide at 30°C 4.4 | | |
| Product obtained after 4 hours of acetalisation | 12.5 | 57 | 4 | 22 | 95.5 | | in dimethylformamide at 30°C 4.5 | 2,200 | |
| Product obtained after 6 hours of acetalisation | 13.5 | 47.5 | 6 | 25 | 92 | | in dimethylformamide at 30°C 5.4 | 2,300 | |
| Product obtained after 10 hours of acetalisation | 13.5 | 42 | 5 | 30 | 90.5 | <0.1 | in dimethylformamide at 30°C 4.6 | 2,350 | |
| Product obtained after 16 hours of acetalisation | 14 | 33 | 5 | 25 | 77 | <0.1 | in dimethylformamide at 30°C 6 | | |

TABLE II

| Sample | % of Cl | % of vinyl acetate groups | % of vinyl alcohol groups | % of 1,3-dioxane groups | % of sulphur | ($\eta$) cm³/g limiting viscosity index | Theoretical DP calculated using the relationship I |
|---|---|---|---|---|---|---|---|
| Telomer prepared according to the conditions of Example 2 after attack by $H_2O_2$ | 8 | | | | | in acetone at 25°C 4.4 | 19 |
| Product obtained after 8 hours of acetalisation | 10.5 | 46 | 5 | 16.5 | <0.1 | in dimethylformamide at 30°C 7.0 | |

TABLE III

| Sample | % of Cl | % of vinyl acetate groups | % of vinyl alcohol groups | % of 1,3-dioxane groups | ($\eta$) cm³/g limiting viscosity index | Theoretical DP calculated using the relationship I |
|---|---|---|---|---|---|---|
| Telomer prepared according to the conditions of Example 3 after attack by H$_2$O$_2$ | 8.5 | | | | in acetone at 25°C 3.6 | 18 |
| Product obtained after 4 hours of acetalisation in the presence of HCl | 10 | 44 | 4.5 | 20 | in dimethylformamide at 30°C 9.3 | |
| Product obtained after 4 hours of acetalisation in the presence of H$_2$SO$_4$ | 8 | 61 | 4.5 | 12 | 7.5 | |
| Product obtained after 8 hours of acetalisation in the presence of HCl | 9.5 | 33 | 4.5 | 21 | in dimethylformamide at 30°C 7.4 | |
| Product obtained after 8 hours of acetalisation in the presence of H$_2$SO$_4$ | 9.5 | 41 | 5 | 19 | 8.3 | |
| Product obtained after 12 hours of acetalisation in the presence of HCl | 10 | 32.5 | 3.5 | 17.5 | in dimethylformamide at 30°C 8.9 | |
| Product obtained after 12 hours of acetalisation in the presence of H$_2$SO$_4$ | 8.5 | 33 | 4 | 19 | 7.5 | |

We claim:

1. A telomer obtained by telomerising vinyl acetate in the presence of carbon tetrachloride at a temperature of about 20°C to 85°C and in the presence of a polymerisation initiator until a product is obtained having a degree of polymerisation $\overline{DP}$ such that:

$$\overline{DP} = \frac{7100}{43\,x} - \frac{78}{43}$$

where $x$ is the % by weight of chlorine in said product, said product then being reacted, in solution, with hydrogen peroxide in glacial acetic acid at a temperature of 50°C to 75°C in the relative proportions of substantially 1 equivalent of free oxygen per equivalent of chlorine contained in said product; then acetalising the product thus obtained with formaldehyde in an inorganic acid medium and recovering the telomer obtained by neutralisation.

2. Telomer according to claim 1 wherein the polymerisation initiator is benzoyl peroxide.

* * * * *